(12) United States Patent
Hämäläinen et al.

(10) Patent No.: US 7,257,424 B2
(45) Date of Patent: Aug. 14, 2007

(54) TRANSCEIVER METHOD IN A RADIO SYSTEM AND A RADIO SYSTEM

(75) Inventors: Jyri Hämäläinen, Oulu (FI); Kari Niemelä, Oulu (FI); Risto Wichman, Helsinki (FI)

(73) Assignee: Nokia Corporation, Espoo (FI)

( * ) Notice: Subject to any disclaimer, the term of this patent is extended or adjusted under 35 U.S.C. 154(b) by 559 days.

(21) Appl. No.: 10/318,408

(22) Filed: Dec. 13, 2002

(65) Prior Publication Data

US 2003/0199270 A1    Oct. 23, 2003

(30) Foreign Application Priority Data

Dec. 14, 2001    (FI)    ................................. 20012474

(51) Int. Cl.
*H04M 1/00*    (2006.01)
*H04Q 7/20*    (2006.01)
*H04B 7/02*    (2006.01)

(52) U.S. Cl. .................... 455/562.1; 455/524; 455/101

(58) Field of Classification Search ............ 455/562.1, 455/575.7, 82, 424, 561, 560, 422.1, 524, 455/525, 101; 370/320, 342

See application file for complete search history.

(56) References Cited

U.S. PATENT DOCUMENTS

| | | |
|---|---|---|
| 5,724,666 A | 3/1998 | Dent |
| 5,903,238 A * | 5/1999 | Sokat et al. ................. 342/365 |
| 6,442,371 B1 * | 8/2002 | Lyu .......................... 455/67.11 |
| 6,697,641 B1 * | 2/2004 | Shapira .................... 455/562.1 |
| 6,889,061 B2 * | 5/2005 | Shapira et al. ........... 455/562.1 |
| 2002/0045427 A1 * | 4/2002 | Lahti et al. .................... 455/97 |
| 2002/0077068 A1 * | 6/2002 | Dent ............................ 455/82 |

FOREIGN PATENT DOCUMENTS

WO    WO 01/86823 A2    11/2001

OTHER PUBLICATIONS

"Layered Space-Time Architecture for Wireless Communication in a Fading Environment When Using Multi-Element Antennas", G. J. Foschini, Bell Labs Technical Journal, Autum 1996, pp. 41-59.

* cited by examiner

Primary Examiner—Tilahun Gesesse
(74) Attorney, Agent, or Firm—Squire, Sanders & Dempsey L.L.P.

(57) ABSTRACT

The invention relates to a radio system and a transceiver method. The method comprises the steps of transmitting a signal of at least one type by a transceiver of the first type; receiving a signal by a transceiver of the second type with at least two differently polarized antennas; performing measurements of the received signal to determine its polarization by using the transceiver of the second type; determining the polarization of the transceiver of the first type; adjusting the signal transmitted by the transceiver of the second type in such a way that the polarization of the signal is matched with the polarization used by the transceiver of the first type; transmitting at least two orthogonally polarized, polarization-matched signals by the transceiver of the second type; and receiving the polarization-matched signals by the transceiver of the first type by using at least two antennas of different polarizations.

34 Claims, 6 Drawing Sheets

TRANSCEIVER METHOD IN A RADIO SYSTEM AND A RADIO SYSTEM

BACKGROUND OF THE INVENTION

1. Field of the Invention

The invention relates to a transceiver method in a radio system in which several antennas are used in the transmission and/or reception of a signal propagating through a radio channel, and a radio system implementing the method.

2. Description of the Related Art

In telecommunication connections, the transmission path used for transmission of signals causes interference for telecommunication, irrespective of the physical form of the transmission path. The transmission path can be a radio link, an optical fibre or a copper cable, for example. In telecommunication utilizing radio links, in particular, situations often arise where the quality of the transmission path varies from one connection to another, and also during the connection. One typical phenomenon causing changes in the transmission channel is fading on the radio path. Other simultaneous connections may also cause interference that may vary in the function of time and place.

Using diversity in the transmitter has been used as one solution to this problem. Diversity methods generally used include time, frequency and antenna diversity, for instance. In time diversity, interleaving and coding are used, with which time diversity is provided for the signal to be transmitted, but the disadvantage is that there will be delays in the transmission, particularly when the channel is slowly fading. In frequency diversity, the signal is transmitted at several frequencies simultaneously. However, the method is inefficient when the coherence bandwidth of the channel is great. In antenna diversity, there is more than one antenna in the signal transmission and/or reception. Thus, the signal components multi-propagated through different channels are not, in all probability, interfered by simultaneous fading.

Multiple antenna techniques, such as antenna or transmission diversity, the use of array antennas or beam forming, allow improvement of performance and improvement of capacity and coverage of the uplink and downlink, for example when time division multiple access (TDMA) and wideband code division multiple access (WCDMA) are used.

Antenna diversity can be divided into receiving and transmitting diversity. In receiving diversity, two or more antennas whose positions or polarizations differ from each other are used for receiving the transmitted signal. In transmission diversity, the same signal is transmitted to the receiver by using two or more different antennas. In prior art solutions, antenna diversity is more generally used in the downlink of a radio system, because in such a case the user equipment does not have to be provided with several antennas. Requirements for the complexity of the user equipment have, in general, been strict, so that prior art solutions tend to use multiple antenna systems based on algorithms executed in a base transceiver station instead of algorithms performed in user equipment.

A known example of such a method is beam forming, with which average improvement of the performance of a radio link is achieved. The aim of beam forming is to increase the average strength of the electric field close to the user equipment by transmitting the same signal with antennas correlating intensively in such a way that the signals are summed up in the direction of the user equipment. The operation of this conventional beam forming is based on determining the average direction of the user equipment.

The MIMO (multiple input, multiple output) method is presently one of the multiple antenna methods having gained wide interest. In this method, a signal is transmitted to a receiver by using two or more different antennas, and the transmitted signal is received by using two or more different antennas. The MIMO is described in more detail in, for instance, the publication by G. J. Foschini, "*Layered Space-Time Architecture for Wireless Communication in a Fading Environment When Using Multi-Element Antennas*", Bell Labs Technical Journal, Autumn 1996, which is incorporated by reference herein. Good performance can be achieved with the MIMO if the signals transmitted and received through different antennas travel through different channels. The problem with MIMO methods has been that the channels must be rather uncorrelated relative to each other in order for the MIMO to function well. In many cases, correlation results from a situation where there is a line-of-sight (LOS) between the base transceiver station and the user equipment, in other words the line from the transmitting antenna to the receiving antenna is unrestricted. The drawback of the MIMO method is thus that it does not function well in line-of-sight situations. A prerequisite for good performance is also that the user equipment of the radio system comprises at least two antennas.

In telecommunication connections, the intention is to transmit a signal in as an errorless manner as possible and, at the same time, to transmit information as efficiently as possible; in other words, the aim is to utilize the capacity of the transmission channel as efficiently as possible in data transmission. The object of interest is particularly the transmission rates achieved in designing cellular radio systems. The third generation and the more recent generations of mobile systems allow arrangement of the transmission rate according to the information to be transmitted. For example, speech can be transmitted at a lower rate than data, and, the highest transmission rate possible can be used for multimedia applications. In MIMO methods, the transmission rate can be increased by sending several different signals simultaneously at the same frequency. Conventionally, the use of diversity and the use of several signals to increase the transmission rate have been alternatives that have excluded each other.

High transmission rates also usually require high transmission power in order for the desired connection quality to be achieved. In addition to the compensation of the effects of the propagation environment, also the so-called spectral efficiency, i.e. achieving the required quality by using radio resources as little as possible, typically at as low a transmission power as possible, affects performance of the transmission path.

The problem with previous methods have been that in some cases, due to the incompatibility of the polarizations of the transmitter and the receiver, the signal does not reach its destination even if the transmission power is increased. A corresponding problem may arise when signals are sent from antennas between which there is correlation.

SUMMARY OF THE INVENTION

An object of the invention is to provide an improved transceiver method in a radio system, and an improved radio system.

An object of the invention is a transceiver method in a radio system in which several antennas are used in signal transmission and/or reception of a signal propagating through a radio channel. The radio system comprises a transceiver of a first type and at least one transceiver of a second type. The transceiver method comprises the steps of transmitting a signal of at least one type by the transceiver of the first type by using at least one antenna; receiving a signal by the transceiver of the second type by using at least two antennas of different polarizations; performing by the transceiver of the second type measurements of the received signal to determine its polarization; determining the polarization of the transceiver of the first type on the basis of the measuring data received from the polarization determination measurements of the received signal; adjusting the signal transmitted by the transceiver of the second type in such a way that the polarization of the signal is matched with the polarization used by the transceiver of the first type; transmitting at least two polarization-matched signals by the transceiver of the second type, wherein the polarization-matched signals are orthogonally polarized relative to each other; and receiving the polarization-matched signals by the transceiver of the first type by using at least two antennas of different polarizations.

An object of the invention is also a transceiver method in a radio system, in which several antennas are used in signal transmission and/or reception of a signal propagating through a radio channel, and wherein the radio system comprises a transceiver of a first type and at least one transceiver of a second type. The transceiver method comprises the steps of transmitting a signal of at least one type by the transceiver of the second type by using at least one antenna; receiving a signal by the transceiver of the first type by using at least two antennas of different polarizations; performing measurements of the received signal by the transceiver of the first type to determine the polarization of the received signal, signalling the measuring data by the transceiver of the first type to the transceiver of the second type; determining the polarization of the transceiver of the second type on the basis of the measuring data received from the polarization determination measurements of the received signal; adjusting the signal transmitted by the transceiver of the second type in such a way that the polarization of the signal is matched with the polarization used by the transceiver of the first type; transmitting at least two polarization-matched signals by the transceiver of the second type, wherein the polarization-matched signals are polarized orthogonally relative to each other; and receiving the polarization-matched signals by the transceiver of the first type by using at least two antennas of different polarizations.

An object of the invention is also a radio system comprising at least two transceivers which comprise several antennas for transmission and/or reception of a signal propagating through a radio channel. At least one of the transceivers comprises means for generating signals polarized in at least two different manners; means for transmitting at least two signals polarized in different manners; means for receiving at least two signals polarized in different manners; means for performing measurements of the received signal to determine its polarization; and means for adjusting the transmitted signals on the basis of the polarization of the received signal, determined based on the measuring data, in such a way that the polarizations of the at least two transmitted signals of different polarizations are matched with the polarization used by another transceiver.

Further, an object of the invention is a radio system comprising at least two transceivers which comprise several antennas for transmission and/or reception of a signal propagating through a radio channel. At least one transceiver further comprises means for generating signals polarized in at least two different manners; means for transmitting at least two signals polarized in different manners; means for receiving at least two signals polarized in different manners; means for receiving, from another transceiver, measuring data of the measurements performed to determine the polarization; and means for adjusting the transmitted signals on the basis of the received signal determined based on the measuring data in such a way that the polarizations of the at least two transmitted signals of different polarizations are matched with the polarization used by the other transceiver.

Further, an object of the invention is a radio system comprising at least two transceivers. At least one transceiver comprises several antennas for transmission and/or reception of a signal propagating through a radio channel, and wherein the transceivers at least one transceiver further comprises means for receiving at least two signals polarized in different manners; means for performing measurements of the received signal to determine its polarization; means for signalling the measuring data to another transceiver.

Other preferred embodiments of the invention are described in the dependent claims.

As noted above, a prerequisite for good operation of the MIMO systems in use has been that the channels are rather uncorrelated relative to each other. Correlation, in turn, is often a result of a line-of-sight situation. In the solution according to the invention, polarization matching is used for improving MIMO channels, in which polarization matching the polarization used by the transceiver of one type in the radio network, usually a base transceiver station, in the signal transmission is matched with the polarization used by the transceiver of another type in the radio network, usually user equipment. Even if the channels correlate, the polarization of the transmission still remains well in the line-of-sight situation. Thus, an advantage of the method and radio system according to the invention is that the MIMO method can also function well in line-of-sight situations.

The problem with methods used previously has been that the signal does not reach its destination even if the transmission power is increased when the polarizations of the transmitter and the receiver are incompatible. When a method and system according to the invention are used, the power level can be maintained low, and still, good operation can be achieved.

Thus, when using a method and radio system according to the invention, at least two signals comprising, in general, different data streams are transmitted via different paths. Due to the polarization matching, these signals usually remain well separated. Thus, the interference level between the signals is lowered, whereby decoding is made more reliable.

A significant advantage of the invention is also that, when at least two different signals are transmitted, the data rate can be increased.

Preferred embodiments of the invention are described in dependent claims.

BRIEF DESCRIPTION OF THE DRAWINGS

The invention will now be described in more detail in connection with preferred embodiments, with reference to the attached drawings, of which

BRIEF DESCRIPTION OF THE PREFERRED EMBODIMENTS

Radio System to which the Invention can be Applied

Figure 1:
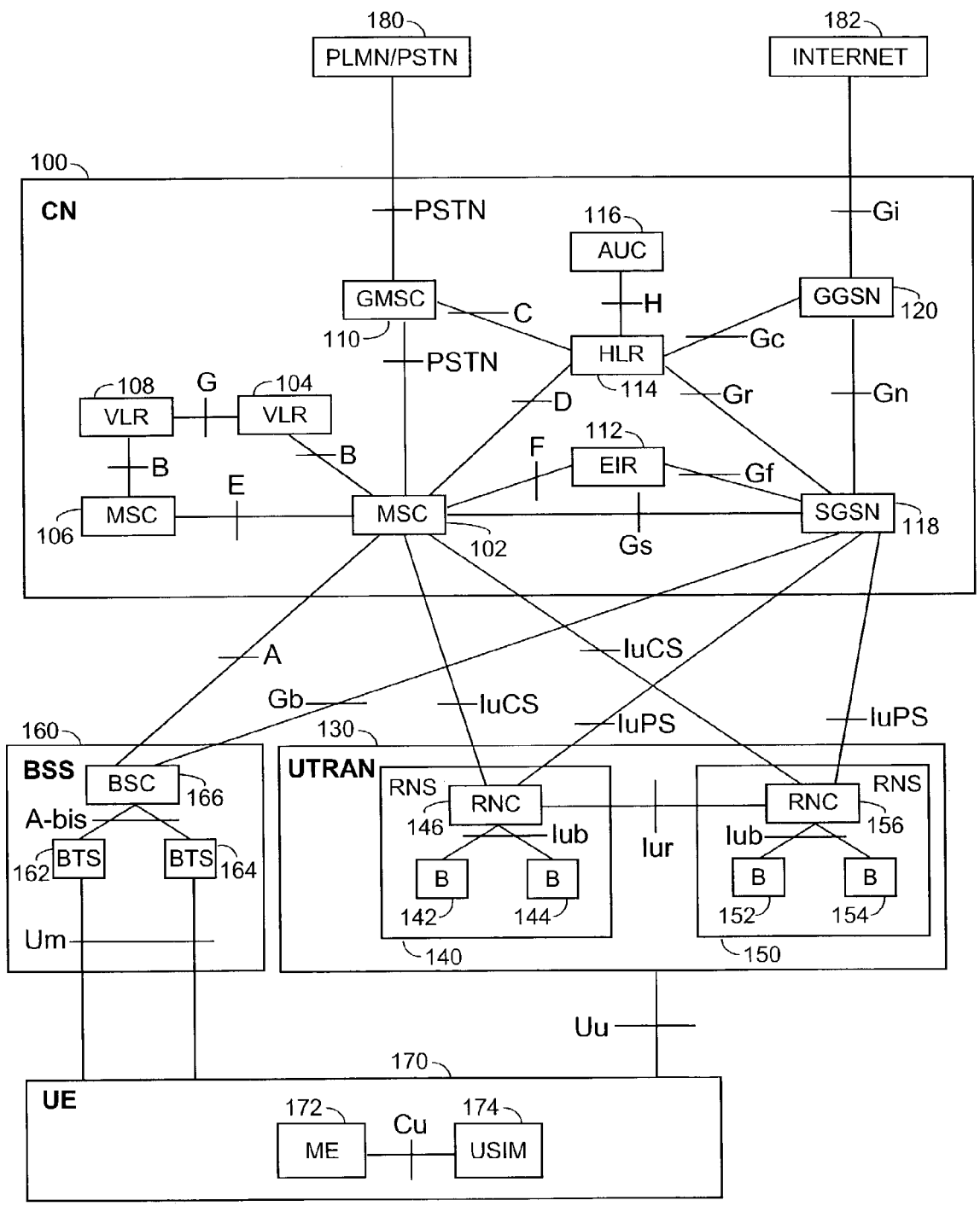
FIG. 1 is a simplified block diagram showing the structure of a radio system.

With reference to FIG. 1, the structure of a radio system is described generally as an example of a system to which embodiments of the invention can be applied. The radio system can be, for example, a third generation radio system according to the UMTS (Universal Mobile Telecommunications System) system employing WCDMA technology (Wideband Code Division Multiple Access), a so-called 2.5-generation GSM/GPRS (Global System for Mobile Communications, GSM) radio system employing GPRS (General Packet Radio System) technology, or a second generation radio system employing GSM technology, or a combination thereof.

Because second-generation radio systems and third-generation radio systems and various combinations thereof, for example, so-called 2.5-generation radio systems, are already used worldwide and being continuously developed, the radio system illustrated in FIG. 1 comprises network elements of different generations in parallel. In the description, second generation radio systems are represented by the GSM, 2.5-generation radio systems are represented by the GPRS system based on packet-switched data transmission, and third generation radio systems are represented by a radio system known at least by the names IMT-2000 (International Mobile Telecommunications 2000) and UMTS. In addition, EDGE (Enhanced Data Rates for Global Evolution) technology, which is used for enhancing the data rate, can be included in the 3G (third generation) technologies. It can be used for increasing transmission rates of 2G (second generation) radio systems based on the GSM, and for implementing packet transmission in the GPRS system, which in its present form represents 2.5-generation radio systems.

However, the embodiments are not restricted to these systems described as examples, but a person skilled in the art can apply the solution according to the invention to other radio systems containing the corresponding features.

FIG. 1 is a simplified block diagram that shows the most important parts of a radio system and the interfaces between them at network-element level. The structure and functions of the network elements are not described in detail, because they are generally known.

The main parts of a radio system are a core network (CN) 100, a radio access network 130 and user equipment (UE) 170. The radio access network 130 is in FIG. 1 expressed with the term UTRAN, which is short for UMTS Terrestrial Radio Access Network, i.e. the radio access network 130 belongs to the third generation and is implemented by wideband code division multiple access (WCDMA) technology. The figure also shows a base station system 160 which belongs to either the second generation or the 2.5 generation and is implemented by time division multiple access (TDMA) technology.

On a general level, the radio system can also be defined to comprise user equipment, which is also known, for instance, as a subscriber terminal and mobile phone, and a network part, which comprises the fixed infrastructure of the radio system such as the core network, the radio access network and the base station system.

The structure of the core network 100 corresponds to a combined structure of the GSM and GPRS systems. The GSM network elements are responsible for establishing circuit-switched connections, and the GPRS network elements are responsible for establishing packet-switched connections. Some of the network elements are, however, in both systems.

A mobile services switching centre (MSC) 102 is the centre point of the circuit-switched side of the core network 100. The same mobile services switching centre 102 can be used to serve the connections of both the radio access network 130 and the base station system 160. The tasks of the mobile services switching centre 102 include: switching, paging, user equipment location registration, handover management, collection of subscriber billing information, encryption parameter management, frequency allocation management, and echo cancellation.

The number of mobile services switching centres 102 may vary. For instance, a small network operator may only have one mobile services switching centre 102, but, in large core networks 100, there may be several. FIG. 1 shows a second mobile services switching centre 106, but its connections to other network elements are not shown to keep FIG. 1 sufficiently clear.

Large core networks 100 may have a separate gateway mobile services switching centre (GMSC) 110 that takes care of circuit-switched connections between the core network 100 and external networks 180. The gateway mobile services switching centre 110 is located between the mobile services switching centres 102, 106 and the external networks 180. An external network 180 can be, for instance, a public land mobile network (PLMN) or a public switched telephone network (PSTN).

A home location register (HLR) 114 contains a permanent subscriber register which can include the following information, for instance: an international mobile subscriber identity (IMSI), a mobile subscriber ISDN number (MSISDN), an authentication key, and when the radio system supports GPRS, a packet data protocol (PDP) address.

A visitor location register (VLR) 104 contains roaming information on user equipment 170 in the area of the mobile services switching centre 102. The visitor location register 104 contains almost the same information as the home location register 114, but, in the visitor location register 104, the information is kept only temporarily.

An equipment identity register (EIR) 112 contains the international mobile equipment identities (IMEI) of the user equipment 170 used in the radio system, and a so-called white list, and possibly a black list and a grey list.

An authentication centre (AuC) 116 is always physically located in the same place as the home location register 114, and contains a subscriber authentication key (Ki) and a corresponding IMSI.

The network elements shown in FIG. 1 are functional entities whose physical implementation may vary. Usually, the mobile services switching centre 102 and visitor location register 104 form one physical device, and the home location register 114, equipment identity register 112 and authentication centre 116 form a second physical device.

A serving GPRS support node (SGSN) 118 is the centre point of the packet-switched side of the core network 100. The main task of the serving GPRS support node 118 is to transmit and receive packets with the user equipment 170 supporting packet-switched transmission by using the radio access network 130 or the base station system 160. The serving GPRS support node 118 contains subscriber and location information related to the user equipment 170.

A gateway GPRS support node (GGSN) 120 is the packet-switched side counterpart to the gateway mobile services switching centre 110 of the circuit-switched side. However, the gateway GPRS support node 120 also routes traffic from the core network 100 to external networks 182, whereas the gateway mobile services switching centre 110 only routes incoming traffic. In our example, external networks 182 are represented by the Internet.

The base station system 160 comprises a base station controller (BSC) 166 and base transceiver stations (BTS) 162, 164. The base station controller 166 controls the base transceiver station 162, 164. In principle, the aim is that the devices implementing the radio path and their functions reside in the base transceiver station 162, 164, and the control devices reside in the base station controller 166.

The base station controller 166 takes care of the following tasks, for instance: radio resource management of the base transceiver station 162, 164, intercell handovers, frequency control such as frequency allocation to the base transceiver stations 162, 164, management of frequency hopping sequences, time delay measurement on the uplink, implementation of the operation and maintenance interface, and power control.

The base transceiver station 162, 164 contains at least one transceiver unit that provides one carrier, i.e. eight time slots, i.e. eight physical channels. Typically one base transceiver station 162, 164 serves one cell, but it is also possible to have a solution in which one base transceiver station 162, 164 serves several sectored cells. In the third generation radio systems, the term 'cell' refers to a sector. The diameter of a cell can vary from a few meters to tens of kilometres. The base transceiver station 162, 164 also comprises a transcoder (not shown in the figure) that converts the speech-coding format used in the radio system to that used in the public switched telephone network and vice versa. In practice, the transcoder is, however, physically located in the mobile services switching centre 102. The tasks of the base transceiver station 162, 164 include: calculation of timing advance (TA), uplink measurements, channel coding, encryption, decryption, and frequency hopping.

The radio access network 130 is made up of radio network subsystems 140, 150. Each radio network subsystem 140, 150 is made up of radio network controllers (RNC) 146, 156 and B nodes 142, 144, 152, 154. A B node is rather an abstract concept, and often the term base transceiver station is used instead.

Operationally, the radio network controller 146, 156 corresponds approximately to the base station controller 166 of the GSM system, and the B node 142, 144, 152, 154 corresponds approximately to the base transceiver station 162, 164 of the GSM system. Solutions also exist in which the same device is both the base transceiver station and the B node. For example, such a device is capable of implementing both the TDMA and WCDMA radio interface simultaneously. In this context, the term 'base transceiver station' is from now on used to refer to both the base transceiver station 162, 164 and the node B 142, 144, 152, 154 of the radio access network 130.

The user equipment 170 comprises two parts: mobile equipment (ME) 172 and UMTS subscriber identity module (USIM) 174. The GSM system naturally uses its own identity module. The user equipment 170 contains at least one transceiver unit (TRX) for establishing a radio link to the radio access network 130 or base station system 160. The user equipment 170 can contain at least two different subscriber identity modules. In addition, the user equipment 170 contains an antenna, user interface and battery. Today, there are different types of user equipment 170, for instance, equipment installed in cars and portable equipment. Properties better known from personal or portable computers have also been implemented in the user equipment 170. One example of this type of user equipment 170 is Nokia® Communicator®.

USIM 174 contains information related to the user and information related to information security in particular, for instance an encryption algorithm.

Finally, the interfaces between different network elements shown in FIG. 1 are listed in Table 1. In UMTS, the most important interfaces are the Iu interface between the core network and the radio access network, which is divided into the interface IuCS on the circuit-switched side and the interface IuPS on the packet-switched side, and the Uu interface between the radio access network and the user equipment. In GSM, the most important interfaces are the A interface between the base station controller and the mobile services switching centre, the Gb interface between the base station controller and the serving GPRS support node, and the Urn interface between the base transceiver station and the user equipment. The interface defines what kind of messages that different network elements can use in communicating with each other. The aim is to provide a radio system in which the network elements of different manufacturers interwork so well as to provide an effective radio system. In practice, some of the interfaces are, however, vendor-dependent.

TABLE 1

| Interface | Between network elements |
| --- | --- |
| Uu | UE-UTRAN |
| Iu | UTRAN-CN |
| IuCS | UTRAN-MSC |
| IuPS | UTRAN-SGSN |
| Cu | ME-USIM |
| Iur | RNC-RNC |
| Iub | RNC-B |
| A | BSS-MSC |
| Gb | BSC-SGSN |
| A-bis | BSC-BTS |
| Um | BTS-UE |
| B | MSC-VLR |
| E | MSC-MSC |
| D | MSC-HLR |
| F | MSC-EIR |
| Gs | MSC-SGSN |
| PSTN | MSC-GMSC |
| PSTN | GMSC-PLMN/PSTN |
| G | VLR-VLR |
| H | HLR-AUC |
| Gc | HLR-GGSN |
| Gr | HLR-SGSN |
| Gf | EIR-SGSN |
| Gn | SGSN-GGSN |
| Gi | GGSN-INTERNET |

Figure 2:
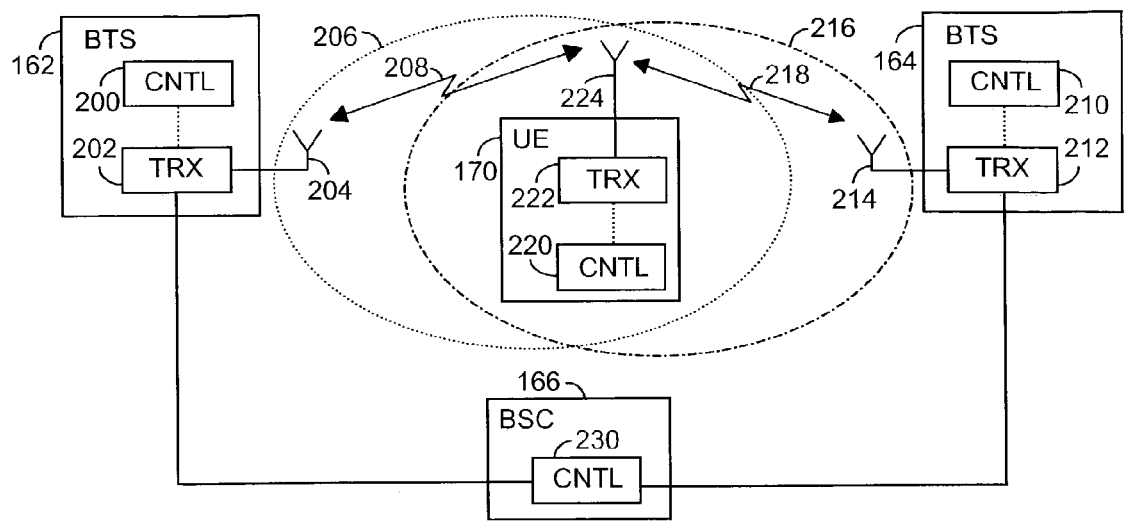
FIG. 2 is a simplified block diagram showing an example of the structure of a base station system and user equipment in a radio system.

Next, the structure of the base station system and user equipment of a radio system is described in general with reference to FIG. 2, as an example of a system and apparatus to which the embodiments of the invention can be applied. The radio system can be, for instance, a radio system employing a 2.5-generation GSM/GPRS radio system or second generation GSM technology, or a combination thereof. The user equipment 170 is located in such an area where both a cell 206 implemented by the first base transceiver station 162 and a cell 216 implemented by the second base transceiver station 164 can be heard.

The first base transceiver station 162 comprises a transceiver unit 202, an antenna 204 and a control unit 200. In the same way, the second base transceiver station 164 comprises a transceiver unit 212, an antenna 214 and a control unit 210. Also the base station controller 166 comprises a control unit 230. The user equipment 170 also comprises a transceiver unit 222 and an antenna 224 for implementing a radio link, and a control unit 220. The transceiver units 202, 212, 222 utilize TDMA technology and, for instance, ordinary GMSK (Gaussian Minimum Shift Keying) modulation of the GSM system, or EDGE modulation, i.e. 8-PSK (8 Phase Shift Keying) modulation.

The control unit 200, 210, 230 refers to a block controlling the operation of the device, which is nowadays usually implemented as a processor with software, but different hardware implementations are also feasible, for example, a circuit constructed of separate logic components or one or more application-specific integrated circuits (ASIC). Also a combination of these implementations can be used. The described functionalities can thus be implemented with control units 200, 210, 220, 230. When selecting the implementation, a person skilled in the art will take into account for example the requirements for the size and power consumption of the device, the required processing power, manufacturing costs and production amounts.

Figure 3:
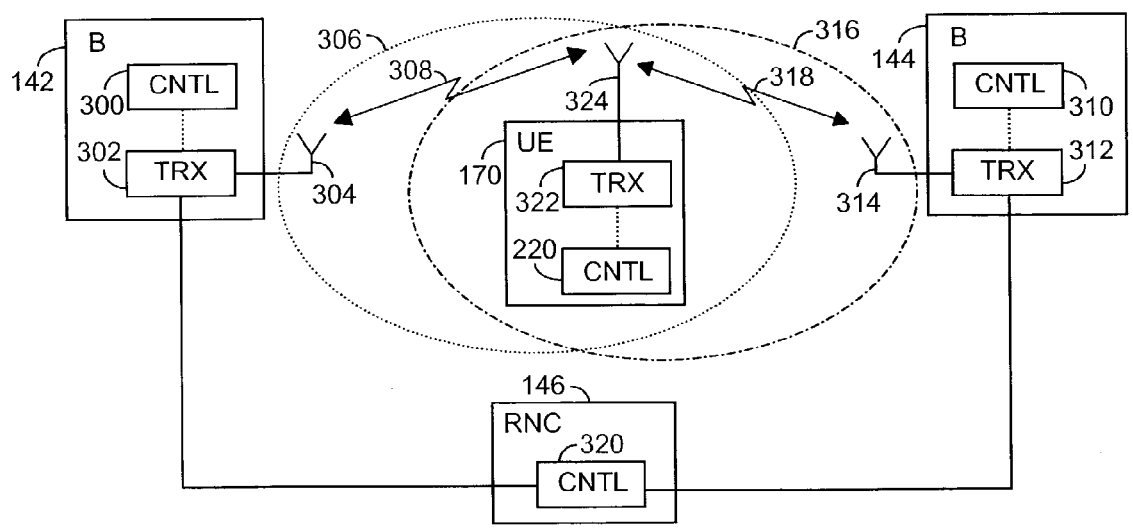
FIG. 3 is a simplified block diagram showing an example of a radio network subsystem in the radio access network of a radio system and of the structure of user equipment.

Next, with reference to FIG. 3, the radio network subsystem 140, 150 in the radio access system 130 of a radio network is explained generally as an example of a system to which the embodiments of the invention can be applied. The radio system can be, for example, a radio system according to the UMTS system, employing the WCDMA technology. The user equipment 170 is located in an area where both a cell 306 implemented by the first base transceiver station 142 and a cell 316 implemented by the second base transceiver station 144 can be heard.

The first base transceiver station 142 comprises a transceiver unit 302, an antenna 304 and a control unit 300. In the same way, the second base transceiver station comprises a transceiver unit 312, an antenna 314 and a control unit 310. Also the radio network controller 146 comprises a control unit 320. The user equipment 170 also comprises a transceiver unit 322 and an antenna 324 for implementing a radio link, and a control unit 220. The transceiver units 302, 312, 320 utilize WCDMA technology. The antennas 304, 314, 324 and control units 300, 310, 320 can be implemented in the manner described in the first embodiment.

Use of Polarization Matching in MIMO Method According to the Invention

Next, the use of polarization matching in the MIMO method according to the invention is illustrated by means of an example. Let us assume that the base transceiver station transmits two different data streams s and z, sending these two different signals through two separate pairs of polarization antennas by using two different polarization branches. It is obvious to a person skilled in the art that one antenna can transmit using only one polarization. Thus, the antenna pair of the base transceiver station comprises two transmission branches polarized in different manners, orthogonally relative to each other, and two transceiver branches orthogonally polarized relative to each other. In the example case, when two antenna pairs are used in the base transceiver station, the signals are thus transmitted using four transmission branches and received using four reception branches altogether. The use of the method is not, however, restricted to this, but can also be used with more antennas. The signals from the different transmission branches of the antenna pair are summed up once they have been transmitted. In other words, the signals to be transmitted are weighted in such a way that they form one signal having given polarization. Here, a polarization branch refers to polarization corresponding to the polarization of a sum signal transmitted through one antenna pair, the different polarization branches being orthogonally polarized relative to each other.

The antennas of the antenna pair differently polarized can in practice be located physically in pairs, which can be separated from each other spatially. Although this is a typical solution, the antennas can be positioned physically in different ways, for example in such a way that the antennas polarized in one way can be grouped into a group of their own, and the antennas polarized in another way correspondingly into a group of their own. It is further assumed that the reception block of the user equipment comprises one polarization antenna pair. In other words, two antenna branches orthogonally polarized relative to each other. Furthermore, it is assumed that the polarizations of the base transceiver station and the user equipment are matched ideally with each other.

Thus, signals $$S_1 = w_1 \cdot s \text{ and } S_2 = w_2 \cdot s$$

are transmitted from the base transceiver station using the first polarization antenna pair through two differently polarized transmission branches, $w_1$ and $w_2$ being weighting coefficients of a complex form, corresponding to the different polarizations. Signals $S_1$ and $S_2$ are summed up once they have been transmitted from the antennas, and polarization of their sum signal is determined by the given weights. In other words, they form the first polarization branch.

The polarization of two transmission branches orthogonally polarized relative to each other are expressed using unit vectors $u_x$ and $u_y$ that are orthogonal unit vectors with respect to X and Y directions, whereby the sum signal S of the signals transmitted through the different transmission branches is $$S = S_1 \cdot u_x + S_2 \cdot u_y = (w^1 \cdot u_x + w_2 \cdot u_y) \cdot s,$$

which forms the first polarization branch.

Correspondingly, by using a second polarization antenna pair cross-polarized relative to the first polarization antenna pair, signals $$Z_1 = v_1 \cdot z \text{ and } Z_2 = v_2 \cdot z$$

are transmitted through two transmission branches orthogonally polarized relative to each other, $v_1$ and $v_2$ being weighting coefficients of a complex form corresponding to the different polarizations.

Thus, the sum signal Z of the two transmission branches, whose polarizations are expressed using unit vectors $u_x$ and $u_y$, is $$Z = Z_1 \cdot u_x + Z_2 \cdot u_y = (v_1 \cdot u_x + v_2 \cdot u_y) \cdot z,$$

which forms the second polarization branch.

By suitably selecting the weights $w_1$ and $w_2$, as well as $v_1$ and $v_2$, the polarizations of the signals corresponding to the transmitted data streams can be adjusted as desired.

For the sake of simplicity, let us assume in the following perfect polarization matching, in which the polarizations of the different branches of the receiver are expressed using vectors $u_x$ and $u_y$. Thus, a signal transmitted to the user equipment through two polarization antenna pairs can be expressed as vector R, i.e.

$$R=(h_{1,1}s+h_{2,1}z)u_x+(h_{2,2}z+h_{1,2}s)u_y.$$

Since the vectors expressing the different polarizations of the receiver are $u_x$ and $u_y$, two signals $R_1$ and $R_2$ are obtained which can be presented as follows:

$$R_1=Ru_x=h_{1,1}s+h_{2,1}z+n_1 \text{ and}$$

$$R_2=Ru_y=h_{2,2}z+h_{1,2}s+n_2,$$

where $h_{ij}$ are channel parameters in such a way that
- $h_{1,1}$ and $h_{2,2}$ represent channels corresponding to the transmitted x and y polarizations,
- $h_{2,1}$ and $h_{1,2}$ are cross-polarization terms, i.e. they represent channels corresponding to the cross-connections between the x and y polarizations; and
- $n_1$ and $n_2$ are terms related to noise and interference.

The above form is the same as in a conventional MIMO method, but an advantage of the method according to the invention is that if the channel maintains the polarization well, $h_{2,1}$ and $h_{1,2}$ are weak in power, whereas $h_{1,1}$ and $h_{2,2}$ are strong. Thus, it is easier for the receiver to express s and z.

If there is no leakage between the polarization branches and the polarizations are maintained well, the cross-polarization terms disappear from the above terms, and the first polarization antenna pair yields a first data stream:

$$R_1=Ru_x=h_{1,1}s+n_1$$

and the second polarization antenna pair yields a second data stream:

$$R_2=Ru_y=h_{2,2}z+n_2.$$

On the other hand, if the polarizations obtained from these polarization antenna pairs mix completely with each other, any conventional MIMO receiver without polarization matching can be used.

Since the polarization is not in practice linear and there is a different number of leakages in different environments between the polarization branches, the benefit obtained from the polarization matching varies case by case. A MIMO receiver should, therefore, be constructed in such a way that it can be adapted to different channel and polarization conditions. The leakage between the polarization branches can be measured by what is called a cross polarization ratio (XPR). In extreme cases where the polarization branches have been completely mixed, the expected value of the XPR is one. Thus, the expected loss caused by the polarization mismatch L is 3 dB. This cannot be avoided by using polarization matching. On the other hand, if the XPR approaches infinite, in other words the polarization branches are preserved completely, the polarization mismatch L is one, and there is no mismatch loss. Thus, the benefit that can be achieved with polarization matching can, in an ideal case, be 3 dB. The benefit is to a great extent dependent on the environment.

Figure 4A:
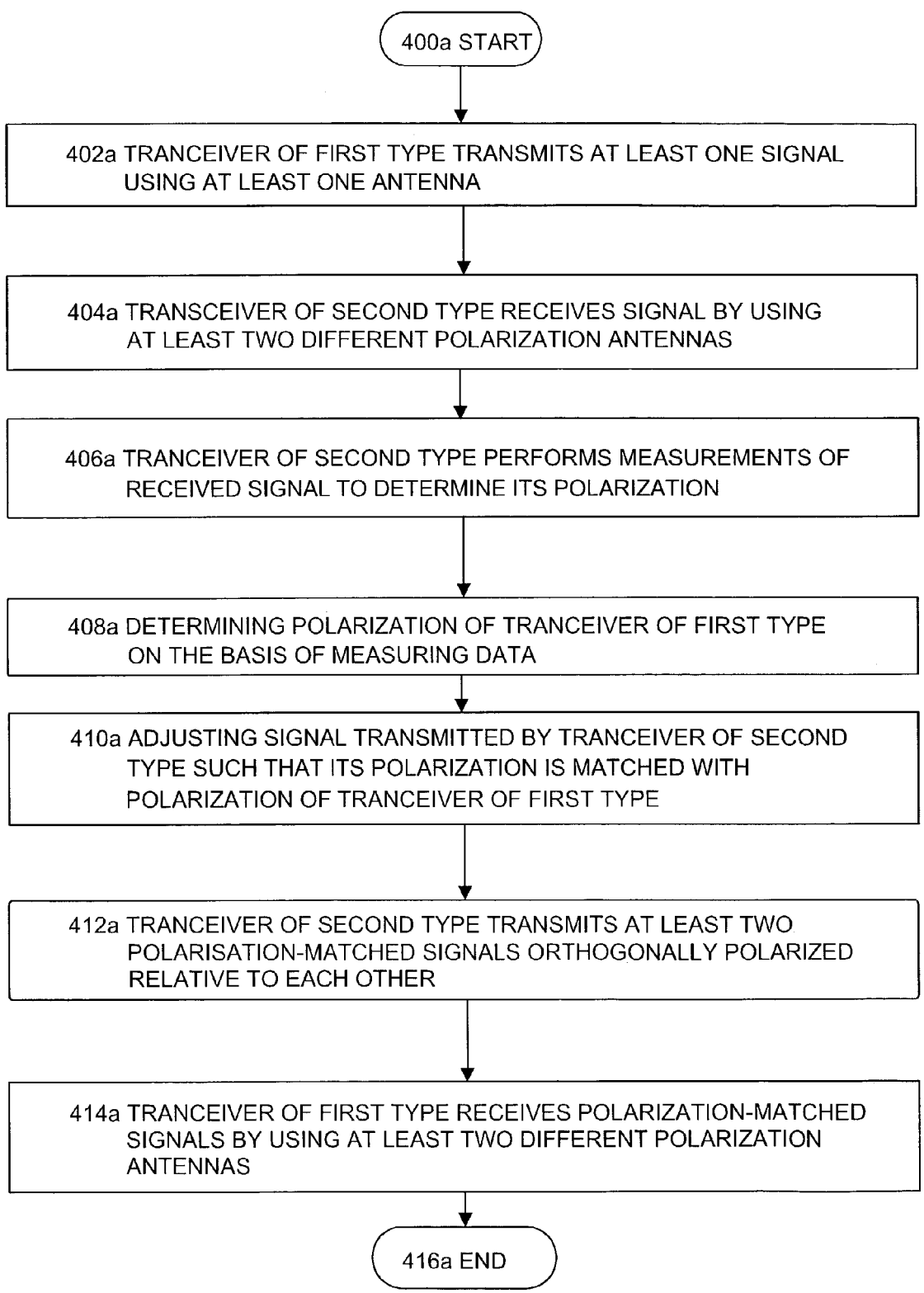
FIG. 4a is a flow chart illustrating an embodiment of a transceiver method.

In the following, an embodiment of a transceiver method, i.e. transmitting-receiving method, is studied with reference to FIG. 4a. In the example of the figure, the transceiver of the first type can be user equipment 170 such as a mobile station MS of a radio system, for example, a mobile phone, and the transceiver of the second type is a base transceiver station of a radio system or a node B. The transceiver of the first type can also be, for instance, a portable computer or another terminal of a radio system. The use of the method is not restricted to such a situation, however, but can also be applied to an opposite case, where the transceiver of the first type is a base transceiver station in a radio system and the transceiver of the second type is a mobile station in a radio system.

The method is started from 400a. In 402a, at least one signal is transmitted by using a mobile station and at least one antenna. The is received by the base transceiver station in 404a by using at least two antennas of different polarizations. In 406a, measurements of the received signal are performed by the base transceiver station to determine the polarization of the signal. Next, in 408a, the polarization of the mobile station is determined on the basis of the measuring data. After this, in 410a, the signal transmitted by the base transceiver station is adjusted on the basis of the polarization determinations in such a way that the polarization of the signal is matched with the polarization of the transceiver of the first type, i.e. the polarization of the mobile station. In 412a, two polarization-matched signals are transmitted by the base transceiver station through antennas polarized in at least two different manners, so that the signals are orthogonally polarized relative to each other. Finally, in 414a, the mobile station receives the polarization-matched signals by using at least two antennas of different polarizations. The method terminates in 416a.

Figure 4B:
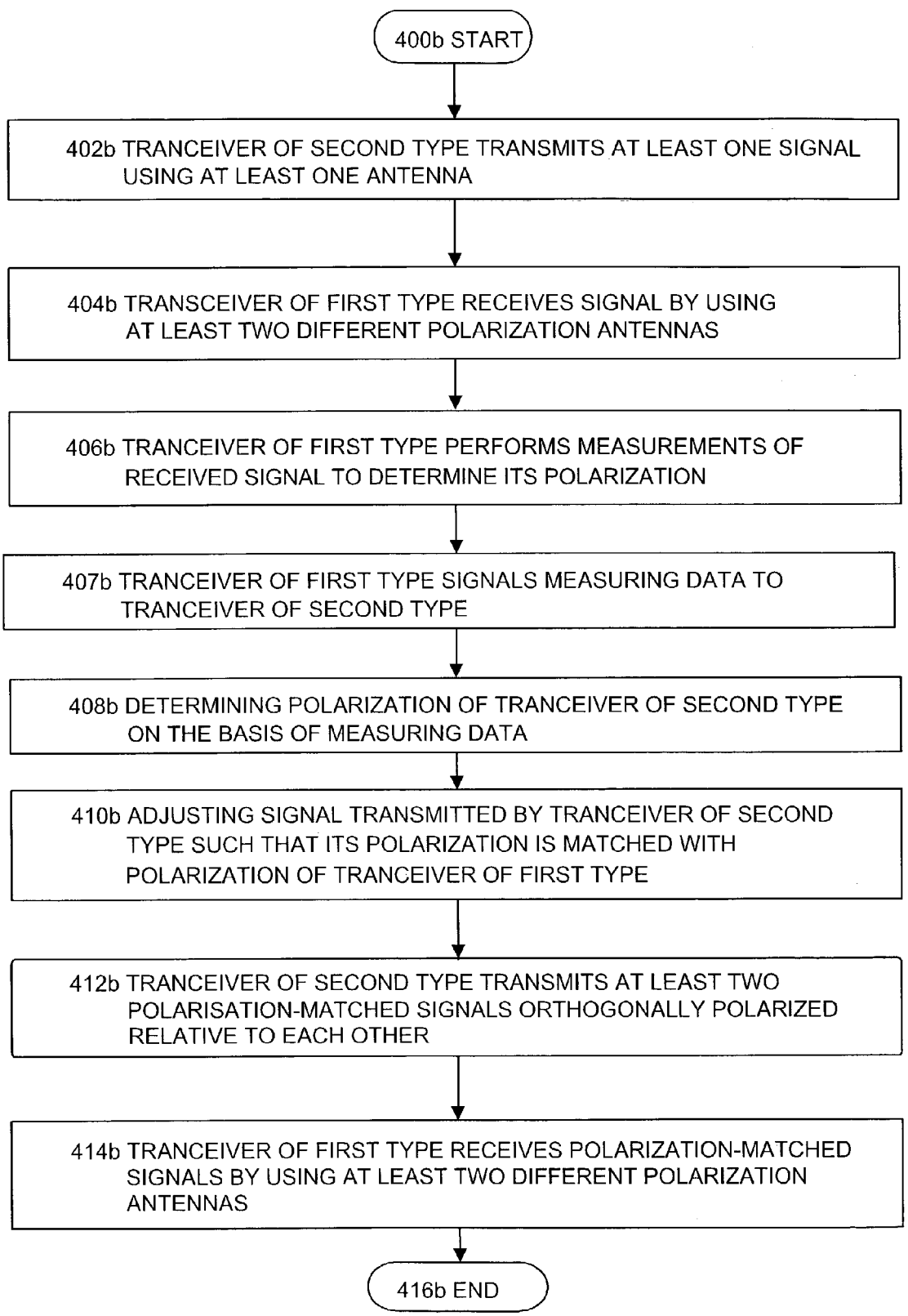
FIG. 4b is a flow chart illustrating a second embodiment of a transceiver method.

It is to be noted that the above describes an embodiment where the polarization determinations are performed by a transceiver of the second type, according to this example case, by the base transceiver station. The method can also be applied in accordance with a second, alternative embodiment shown in FIG. 4b, whereby in 402b the base transceiver station transmits at least one signal by using at least one antenna, and the mobile station receives the signal by using at least two different polarization antennas. From 402b, the method moves on to 406b, in which the polarization determination measurements are performed by the mobile station. In 407b, the method signals the measuring data to the base transceiver station. After this, the method moves on, in the same way as in the first embodiment, from 408b, where the polarization of the base transceiver station is determined on the basis of the measuring data, and further, in 410b, the signal of the base transceiver station is controlled in such a way that its polarization is matched with the polarization of the transceiver of the first type, i.e. the mobile station. Finally, in 412b, two polarization-matched signals are transmitted by the base transceiver station, and the signals are orthogonally polarized relative to each other. The signals are received, in 414b, by the mobile station by using at least two different polarization antennas. The method is terminated in 416b.

The method can further be applied in such a way that if it is determined, on the basis of the measuring results, that the polarizations cannot be separated. Then, an adaptation of the radio system is performed to use a conventional transceiver method using several antennas in the transmission and/or reception. In other words, the method ceases to use polarization matching and moves over to a conventional MIMO method.

Figure 5:
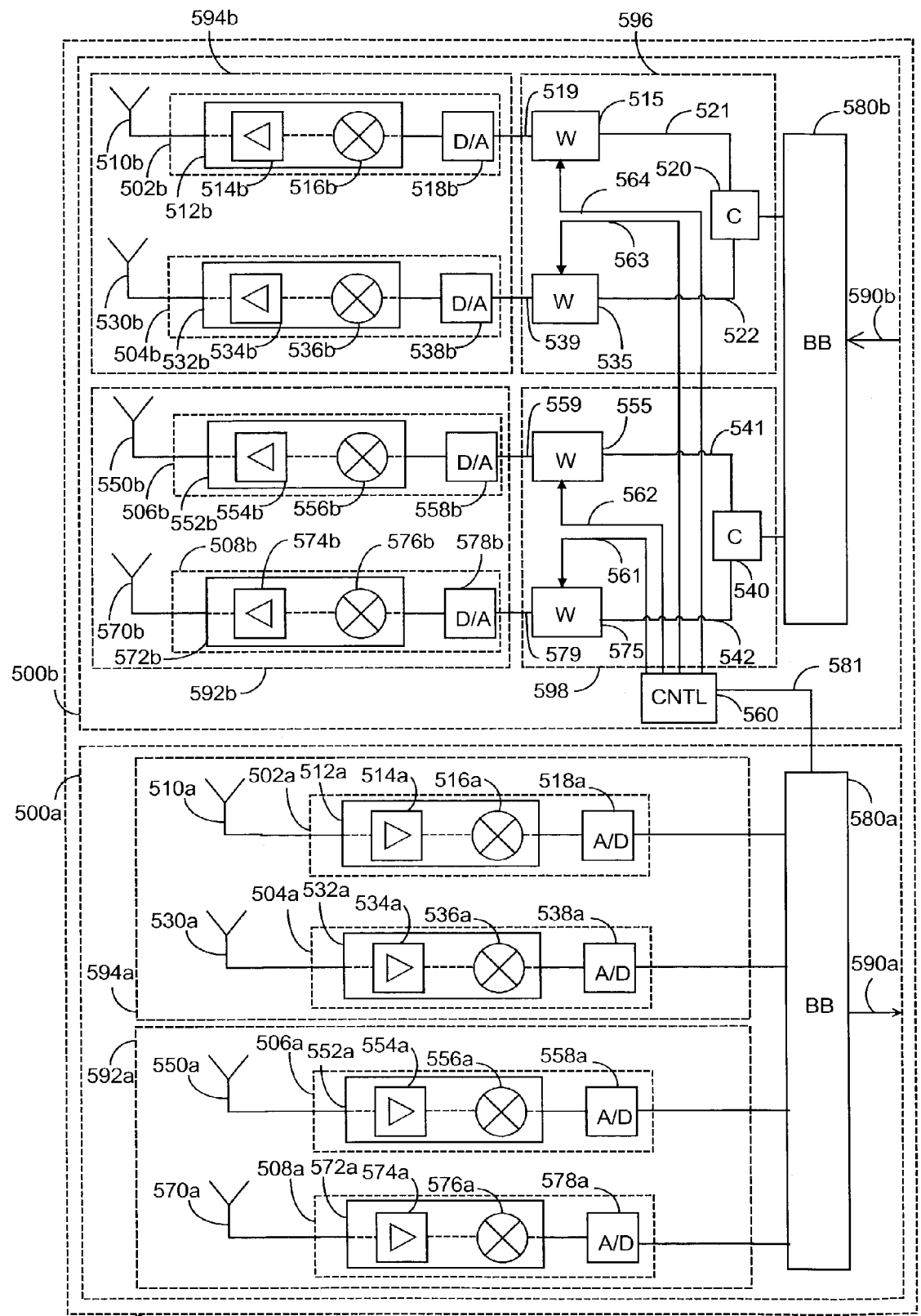
FIG. 5 is a simplified block diagram showing an example of a transceiver.
Figure 6:
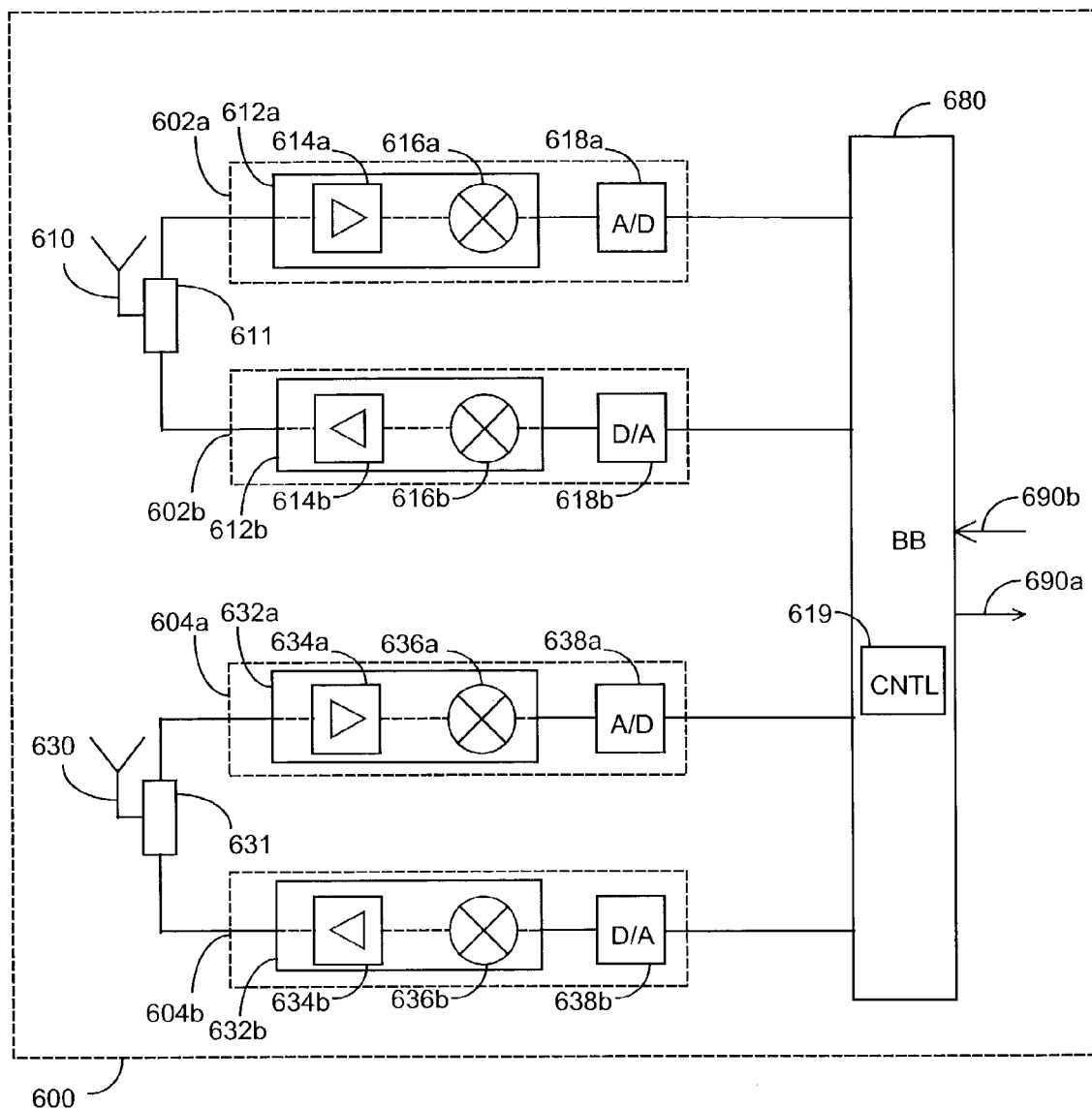
FIG. 6 is a simplified block diagram showing a second example of a transceiver.

Let us next study an embodiment of the transceiver method in more detail with reference to FIGS. 5 and 6, which uses transceivers 500, 600 in the radio system to implement this embodiment. In the embodiment, a transceiver method of a radio system according to the MIMO method is used, in which several antennas are used in the transmission and/or reception of a signal propagating through a radio channel. The radio system comprises a transceiver of the first type and at least one transceiver of the second type. In the embodiment, the MIMO method is used for providing both transmission and reception diversity on the downlink, and for providing reception diversity on the uplink. The use of the method is not restricted to this example. For instance, transmission diversity MIMO can also be used on the uplink as well. Diversity is provided by using differently polarized antennas, in the example case, by using at least two antennas polarizing orthogonally in different ways.

In the example, the transceiver of the first type can be user equipment 170 such as a mobile station 600 of a radio system, for example, a mobile phone. The transceiver of the second type can be a base transceiver station 500 of a radio system. In other words, in the embodiment the described mobile station 600 represents the transceiver of the first type, and the described base transceiver station 500 represents the transceiver of the second type. However, the method can as well be used in the opposite case, where the transceiver of the first type is a base transceiver station of a radio system and the transceiver of the second type is a mobile station of a radio system. The example is based on the embodiment of FIG. 4a. The embodiment of FIG. 4b can also be described by means of the transceivers of FIGS. 5 and 6, i.e. by means of the mobile station 500 and the base transceiver station 600.

One alternative for implementing the method is also that the mobile station transmits at a normal data rate. In other words, it transmits the same signal from two different antenna branches, whereby it can match its polarization with the antenna polarization it measures. This alternative is used mostly in cases where the base transceiver station has an antenna or antenna array using only one fixed polarization available.

In the embodiment of FIGS. 5 and 6, the transceiver of the first type, i.e. the mobile station 600, comprises one pair of antennas differently polarized, preferably a cross-polarized pair of antennas. In other words, two cross-polarized reception branches 602a, 604a and two cross-polarized transmission branches 602b, 604b can be used.

Transmission is carried out by the mobile station 600 by using double data rate. In other words, two different signals are transmitted by using antenna means 610, 630 and both transmission branches 602b, 604b. The payload of the signal bursts comprises what is called a training sequence code, and data bit sequences. The training sequence code is responsible for adjusting the digital filter of the receiver to reception which is as errorless as possible, keeping the timing of the mobile and eliminating interfering signals.

Alternatively, the mobile station 600 can transmit at a normal data rate. In other words, the mobile station 600 can transmit a signal by using only one of the antenna or transmission branches, for example, antenna means 610 and a transmission branch 602b. Thus, the transceiver of the second type, i.e. the base transceiver station 500, utilizes, in the determination of the antenna branch polarization, the advance information. The second antenna means 630 of the mobile station 600 use polarization that is orthogonal, in other words, perpendicular relative to the polarization of the first antenna means 610.

The base transceiver station 500 of the radio network receives the signals transmitted by the mobile station 600 with antenna means 510a, 530a, 550a, 570a in the reception block 500a. The signal received with the antenna means is taken to a duplex filter (not shown in FIG. 5), which separates the transmission and reception frequencies from each other. After this, the signals are amplified and converted into a digital mode in the reception branch 502a, 504a, 506a, 508a. The amplification is done by using amplifiers 514a, 534a, 554a, 574a. After the amplification, the signal is down-converted, in other words, converted into a lower frequency, from a radio frequency into a baseband frequency in a down-converter 516a, 536a, 556a, 576a. The conversion can also be performed from a radio frequency into an intermediate frequency, whereby the conversion into a baseband frequency is performed later. After the down-conversion, the signal is converted from analogue into digital with an analogue/digital converter 518a, 538a, 558, 578a. Next, the digital signals are directed to be processed in a reception block baseband frequency part 580a. In the baseband frequency part 580a of the reception block attending to the signal processing functions, the signal can be further processed as desired. This processing can comprise deinterleaving and decoding, for example, as is obvious to a person skilled in the art.

In the reception block baseband frequency part 508a, channel estimation is performed on the signals corresponding to each transmission branch 502a, 504a, 506a, 508a, as a result of which separate channel parameters can be determined for each branch on the basis of the training sequence code in the signal. The channel parameters received as a result are further directed to a control unit 560. The received data is expressed in the reception block baseband frequency part 580a and the information bits of the data are further directed along a bus 590a.

In the control unit 560, channel parameters are filtered, whereby the relative powers and phases of the signals received from each transmission branch 502a, 504a, 506a, 508a are determined. On the basis of the results, the polarizations of antennas 610, 630 of the mobile station 600 are determined, and corresponding complex weights are determined for them. Complex weights $w_1$, $w_2$ correspond to the polarization of the antenna 610, and complex weights $v_1$, $v_2$ correspond to the polarization of the antenna 630 of the mobile station.

The information bits of the data transmitted from the transceiver of the second type, that is, from the transmission block 500b of the base transceiver station 500 of the radio network, are directed along a bus 590b to the transmission block baseband frequency part 580b, where they are divided into two groups, which are further coded and modified into a suitable system-dependent form. The system used can be, for instance, a WCDMA or a GSM/EDGE system. Besides prior to the coding and other modification, division into groups can be done during or after it, whereby the standards of the system in question must be taken into account.

The received modified data streams are directed to copying blocks 520, 540, where copies are formed of them. Thus, for example, a data stream data1 is copied in the copying block 520 to data streams data11 and data12, and, in the copying block 540, in turn, a data stream data2 is copied into data streams data21 and data22.

Next, data11 is directed along a bus 521 to a weighting block 515, where it is multiplied with weight $w_1$ received from a control unit 560 along a bus 564, and data12 is directed along a bus 563 to a weighting block 535, where it is multiplied with weight $w_2$ received along the bus 563. Correspondingly, data21 is directed along a bus 541 to a weighting block 555, where it is multiplied with weight $v_1$ received from a control unit 560 along a bus 562, and data22 is directed along a bus 542 to a weighting block 575, where it is multiplied with weight $v_2$ received along a bus 561.

Next, the weighted data11 is directed along a bus 519 to a transmission branch 502b, where it is amplified and converted into an analogue mode. The data is converted from digital into analogue by using a digital/analogue converter 518b, after which it is upconverted to a radio frequency. In other words, the signal is raised to a higher radio frequency by using an up-converter 516b. Next, the signal is amplified by using an amplifier 514b. Correspondingly, the weighted data data12, data21 and data22 are directed along buses 539, 559, 579 to transmission branches 504b, 506b and 508b, where they are converted into an analogue mode with digital/analogue converters 538b, 558b, 578b, and further up-converted in up-converters 536b, 556b, 576b and amplified in amplifiers 534b, 554b, 574b. After this, the analogue data streams polarization-matched with the polarizations of the antennas 610, 630 of the mobile station 600 are transmitted via duplex-filters (not shown in the figure) by using antenna means 510b, 530b, 550b, 570b.

Finally, the mobile station 600 receives the signals transmitted by the base transceiver station 500 with the antenna means 610, 630 using different polarizations.

In FIG. 5, for the sake of simplicity, the blocks responsible for the reception functions of the transceiver of the second type, i.e. the base transceiver station 500, are separated into a separate reception block 500a, and the blocks responsible for the transmission functions are separated into a separate transmission block 500b In practice, part of the functionalities of different blocks can, however, be located in the same blocks, or part of the functionalities can be located in a block other than the one shown in FIG. 5. The control unit 560, for example, can be located in the transmission block 500b and not in the reception block 500a. On the other hand, it can also be located in the transmission block baseband part 580a or in the reception block baseband frequency part 580b. Further, the reception block 500a and the transmission block 500b can use common antenna means for receiving signals, instead of to antenna means that are separate for each unit. The cross-polarized antenna pairs have been spatially separated from each; in other words, the antenna means 510a, 530a are spatially separated from the antenna means 550a, 570a. In the same way, the antennas 510b, 530b have been spatially separated from the antennas 550b and 570b.

The functions of the reception block baseband frequency parts 580a and the transmission block baseband frequency parts 580b, as well as the functions of the control unit 560, are typically implemented with a processor and its software. Different hardware implementations and combinations of different implementations are also feasible. The copying blocks 520, 540 and the weighting blocks 515, 535, 555, 575 can be implemented correspondingly.

The base station 500 also comprises processor means (not shown in the figure), which control the operation of the other parts of the base transceiver station 500, for example, the phasing of the antennas in a desired direction in each particular case. The processor means can be implemented with a general or signal processor or with a separate logic.

Next, let us study with reference to FIG. 6 an example of the structure of a transceiver of the first type used in a radio system according to the invention, which is in the example case a mobile phone functioning as the mobile station 600. The mobile station 600 comprises one antenna pair comprising two antennas 610, 630 differently polarized, preferably cross-polarized, as well as two reception branches 602a, 604a and two transmission branches 602b, 604b.

The mobile station 600 comprises a baseband frequency part 680 and antenna means 610, 630, by means of which signals are received and transmitted through duplex filters 611 in the mobile station. The transmission and reception frequencies are separated from each other with a duplex filter. In the baseband frequency part 680 of the mobile station, required actions are taken to process the user's speech or data generated by the user, such as the DSP (digital signal processing), and filtering.

The mobile station 600 transmits signals via transmission branches 602b, 604b and receives signals via reception branches 602a, 604a. It will be obvious to a person skilled in the art that the transmission branch 602b, 604b of the mobile station 600 also comprises means for coding and modulating (not shown in the figure) of the signal 690b to be transmitted. The signal taken from these means is transmitted to the RE part, i.e. radio frequency part 612b, 632b, of the transmission branch 602b, 604b. In the radio frequency part 612b, 632b, the signal to be transmitted is up-converted to a radio frequency in an up-converter 616b, and amplified to a sufficient transmission power. Next, the signal is taken via the duplex filter 611 to the antenna means 610, 630. In the example case, there are two antennas as well as two transmission and reception branches, but their number is not restricted to two. For instance, there may be only one antenna and one transmission or reception branch, or more than two antennas and branches. Since the MIMO method is used, the number of either the transmission or reception branches must be more than one. In the transmission or reception in accordance with FIG. 6, the same antenna means can be used, but transmission and reception can also be performed by using separate antenna means, whereby each transmission branch has antenna means of its own and each reception branch has antenna means of its own.

The mobile station 600 also comprises control means 619, which comprise, for example, computing means and means for controlling the operation of other blocks of the mobile station. These control means 619 are in the case of FIG. 6 implemented in a baseband frequency part 680. Also coding and decoding, such as channel and speech coding, can be performed with means which are, in the case of FIG. 6, comprised by the baseband frequency part 680 of the mobile station. The baseband frequency part 680 and the control, coding and decoding means performing the above functions can be implemented in a plurality of ways, for example, with a software and/or hardware implementation, such as a logic constructed of separate components or application-specific integrated circuits (ASIC).

The mobile station 600, for example, a mobile phone, typically comprises a loudspeaker and an earpiece, a microphone and a display, and possibly a keyboard (not shown in the figure), which are connected to the control part of the mobile station. The mobile station typically also comprises different memory elements (not shown in the figure), which contain for instance stored data, such as data on the operation of the radio network and the transmission power of the base transceiver station. The memory element also comprises a program and sub-programs controlling the operation of the mobile station.

The above describes an embodiment in which the measurements for determining the polarization are performed by the base transceiver station 500. However, in accordance with an alternative embodiment of FIG. 4b, the measurements can also be performed by the mobile station 600. In such a case, the measurements for determining the polarization are preferably performed by measuring the level and quality of the received signal, after which the measurement results are signalled to the base transceiver station 500, which controls the signal it transmits on the basis of the measurement results.

In the described example, the polarization-matched signal transmitted by the transceiver of the second type, i.e. the base transceiver station 500, comprises at least two signals orthogonally polarized relative to each other. The method is not confined to this, but could as well be implemented by using several signals, for example, in such a way that the polarization-matched signal transmitted by the transceiver of the second type would comprise at least three signals orthogonally polarized relative to each other.

Further, in the above example, the method is implemented in such a way that the transmission polarization of the other type of transceiver, in the example case the mobile station, is not adjustable, but it transmits using fixed polarization. The use of the method is not restricted to this. For instance, the transmission polarization of the mobile station could as well be adjustable.

In accordance with the above example, the determination of the polarization of the received signal can be performed in a transceiver 600, 500, but, alternatively, the measuring data can be transferred from the measuring transceiver 600, 500 to another network part 160, 130 in the radio system, for example, to the base station controller 166 or radio network controller 146, 156, in which the polarization of the received signal is determined. Further, the method can also be used in such a way that the measuring data collected by several transceivers 600 is transferred from the transceiver 600 to another network part 160, 130 in the radio system, for example, to the base station controller (BSC) 166 or radio network controller 146, 156, in which the polarization of the received signal is determined. Measuring data collected from several transceivers, i.e. base transceiver stations 500, can be transferred to the network part 160, 130, which then process the data. Subsequently, decisions on network management, for example, on handover (HO) of the mobile station 600 from one base transceiver station 500 to another, can be made in the network part 160, 130 on the basis of the received data and the defined polarizations.

Although the invention has been described above with reference to the examples according to the attached drawings, it is obvious that it is not restricted thereto, but can be modified in a plurality of ways within the inventive idea of the attached claims.

We claim:

1. A transceiver method in a radio system using several antennas for at least one of a signal transmission and a signal reception of a signal propagating through a radio channel, and wherein the radio system comprises a transceiver of a first type and at least one transceiver of a second type, the method comprising:

transmitting a signal of at least one type by a transceiver of a first type by using at least one antenna;

receiving a signal by a transceiver of a second type by using at least two antennas of different polarizations;

performing by the transceiver of the second type measurements of the received signal to determine a polarization of the received signal;

determining a polarization of the transceiver of the first type based upon measured data received from polarization determination measurements of the polarization of the received signal;

adjusting a signal transmitted by the transceiver of the second type to match the polarization of the signal transmitted by the transceiver of the second type with the polarization used by the transceiver of the first type;

transmitting at least two polarization-matched signals by the transceiver of the second type, wherein one signal of the at least two polarization-matched signals is orthogonally polarized relative to another signal of the at least two polarization-matched signals, and wherein the at least two polarization-matched signals comprise different data streams with different content; and receiving the at least two polarization-matched signals by the transceiver of the first type by using at least two antennas of different polarizations.

2. A method according to claim 1, wherein the polarization determination measurements are performed by measuring a power and a phase of the received signal.

3. A method according to claim 2, wherein the polarization determination measurement is further determined by filtering powers and phases of the received signal.

4. A method according to claim 1, wherein the polarization of the received signal is determined in a transceiver.

5. A method according to claim 1, the method further comprising transferring the measured data from a measuring transceiver to another network part of the radio system, wherein a part of the polarization of the received signal is determined.

6. A method according to claim 1, the method further comprising adapting a radio system to use a conventional transceiver method utilizing several antennas in at least one of a transmission and a reception if, based upon measurement results, the polarizations of the received signal cannot be separated.

7. A method according to claim 1, the method further comprising transferring the measured data collected by several transceivers from a measuring transceiver to another network part of the radio system, wherein a part of the polarization of the received signal is determined and a decision on handover is made.

8. A method according to claim 7, wherein the another network part of the radio system processes the measured data collected from several transceivers.

9. A method according to claim 1, wherein the polarization-matched signal transmitted by the transceiver of the second type comprises one signal of at least two signals orthogonally polarized relative to another signal of the at least two signals.

10. A method according to claim 1, wherein the polarization-matched signal transmitted by the transceiver of the second type comprises one signal of at least three signals orthogonally polarized relative to another signal of the at least three signals.

11. A method according to claim 1, wherein the transceiver of the first type comprises user equipment in the radio system, and a transceiver of the second type comprises a base transceiver station in the radio system.

12. A method according to claim 11, wherein the polarization of the transceiver of the first type is not adjustable.

13. A method according to claim 1, wherein the transceiver of the first type comprises a base transceiver station in the radio system, and a transceiver of the second type comprises user equipment in the radio system.

14. A transceiver method in a radio system using several antennas for at least one of a signal transmission and a signal reception propagating through a radio channel, and wherein the radio system comprises a transceiver of a first type and at least one transceiver of a second type, the method comprising:

transmitting a signal of at least one type by a transceiver of a second type by using at least one antenna;

receiving a signal by a transceiver of a first type by using at least two antennas of different polarizations;

performing measurements of the received signal by the transceiver of the first type to determine a polarization of the received signal;

signalling measured data by the transceiver of the first type to the transceiver of the second type;

determining a polarization of the transceiver of the second type based on the measured data received from polarization determination measurements of the polarization of the received signal;

adjusting the signal transmitted by the transceiver of the second type to match the polarization of the signal transmitted by the transceiver of the second type with the polarization used by the transceiver of the first type;

transmitting at least two polarization-matched signals by the transceiver of the second type, wherein one signal of the at least two polarization-matched signals is polarized orthogonally relative to another signal of the at least two polarization-matched signals, and wherein the at least two polarization-matched signals comprise different data streams with different content; and receiving the at least two polarization-matched signals by the transceiver of the first type by using at least two antennas of different polarizations.

15. A method according to claim 14, wherein the polarization determination measurements are performed by measuring a power and a quality of the received signal.

16. A radio system comprising at least two transceivers, wherein the at least two transceivers comprise several antennas for at least one of a transmission and a reception of a signal propagating through a radio channel, at least one of the transceivers further comprising:

means for generating signals polarized in at least two different manners;

means for transmitting at least two signals polarized in different manners;

means for receiving at least two signals polarized in different manners;

means for performing measurements of the at least two received signals to determine a polarization of the at least two received signals; and means for adjusting the at least two transmitted signals based upon the polarization of the at least two received signals, wherein the polarization of the at least two received signals is determined based on measured data, wherein the means for adjusting match the polarizations of the at least two transmitted signals of different polarizations with a polarization used by another transceiver and outputting at least two polarization-matched signals indicative thereof, and wherein the at least two polarization-matched signals comprise different data streams with different content.

17. A radio system according to claim 16, further comprising means for determining a polarization used by a transceiver based upon the measured data.

18. A radio system according to claim 16, wherein the at least one of the transceivers further comprises means for determining the polarization used by the another transceiver based upon the measured data.

19. A radio system according to claim 16, wherein the at least one of the transceivers further comprises means for measuring a power and a phase of the at least two received signals.

20. A radio system according to claim 16, wherein the at least one of the transceivers further comprises means for measuring a power and a quality of the at least two received signals.

21. A radio system according to claim 16, wherein the at least one of the transceivers further comprises means for transferring the measured data from a measuring transceiver to another network part of a radio system, wherein a portion of the polarization of the at least two received signals is determined.

22. A radio system according to claim 16, further comprising means for determining based upon measurement results indicating whether the polarization of the at least two received signals can be separated.

23. A radio system according to claim 16, further comprising means for performing adaptation for a radio system to use a conventional transceiver method using several antennas in at least one of a transmission and a reception of a signal.

24. A radio system according to claim 16, wherein a network part of a radio system comprises means for processing measured data collected from several transceivers.

25. A radio system according to claim 16, wherein the at least one of the transceivers further comprises means for generating two linearly cross-polarized signals.

26. A radio system according to claim 16, wherein the at least one of the transceivers further comprises means for generating three linearly cross-polarized signals.

27. A radio system according to claim 16, wherein the at least one of the transceivers comprises a base transceiver station in a radio system.

28. A radio system according to claim 16, wherein the at least one of the transceivers comprises user equipment in a radio system.

29. A radio system according to claim 16, wherein a network part of a radio system comprises means for making a handover decision based upon polarization determinations of the at least one of the transceivers of the radio system.

30. A radio system comprising at least two transceivers, wherein the at least two transceivers comprise several antennas for at least one of a transmission and a reception of a signal propagating through a radio channel, at least one of the transceivers further comprising:

means for generating signals polarized in at least two different manners;

means for transmitting at least two signals polarized in different manners;

means for receiving at least two signals polarized in different manners;

means for receiving, from another transceiver, measured data of measurements performed to determine a polarization; and means for adjusting the at least two transmitted signals based upon at least one signal of the at least two received signals determined based on the measured data, wherein the means for adjusting match polarizations of the at least two transmitted signals of different polarizations with a polarization used by the another transceiver and outputting at least two polarization-matched signals indicative thereof, and wherein the at least two polarization-matched signals comprise different data streams with different content.

31. A radio system comprising at least two transceivers, wherein at least one transceiver comprises several antennas for at least one of a transmission and a reception of a signal propagating through a radio channel, the at least one transceiver further comprising:

means for receiving at least two signals polarized in different manners;

means for performing measurements of the at least two received signals to determine a polarization;

means for transmitting different data streams by using different polarization-matched signals, wherein one signal of the at least two polarization-matched signals is orthogonally polarized relative to another signal of the at least two polarization-matched signals, and wherein the at least two polarization-matched signals comprise different data streams with different content; and means for signalling measured data to another transceiver.

32. A radio system comprising at least two transceivers, wherein the at least two transceivers comprise several antennas for at least one of a transmission and a reception of a signal propagating through a radio channel, at least one of the transceivers further comprising:
   a first control unit configured to generate signals polarized in at least two different manners;
   a first transmitter configured to transmit at least two signals polarized in different manners;
   a receiver configured to receive at least two signals polarized in different manners;
   a second control unit configured to perform measurements of the at least two received signals to determine a polarization of the at least two received signals;
   a third control unit configured to adjust the at least two transmitted signals based upon the polarization of the at least two received signals, wherein the polarization of the at least two received signals is determined based on measured data;
   a fourth control unit configured to match the polarizations of the at least two transmitted signals of different polarizations with a polarization used by another transceiver and to output at least two polarization-matched signals indicative thereof, wherein the at least two polarization-matched signals comprise different data streams with different content; and
   a second transmitter configured to transmit the different data streams.

33. A radio system comprising at least two transceivers, wherein the at least two transceivers comprise several antennas for at least one of a transmission and a reception of a signal propagating through a radio channel, at least one of the transceivers further comprising:
   a first control unit configured to generate signals polarized in at least two different manners;
   a first transmitter configured to transmit at least two signals polarized in different manners;
   a first receiver configured to receive at least two signals polarized in different manners;
   a second receiver configured to receive, from another transceiver, measured data of measurements performed to determine a polarization;
   a second control unit configured to adjust the at least two transmitted signals based upon at least one signal of the at least two received signals determined based on the measured data;
   a third control unit configured to match the polarizations of the at least two transmitted signals of different polarizations with a polarization used by another transceiver and to output at least two polarization-matched signals indicative thereof, wherein the at least two polarization-matched signals comprise different data streams with different content; and
   a second transmitter configured to transmit the different data streams.

34. A radio system comprising at least two transceivers, wherein at least one transceiver comprises several antennas for at least one of a transmission and a reception of a signal propagating through a radio channel, the at least one transceiver further comprising:
   a receiver configured to receive at least two signals polarized in different manners;
   a first control unit configured to perform measurements of the at least two received signals to determine a polarization;
   a transmitter configured to transmit different data streams by using different polarization-matched signals;
   a second control unit configured to orthogonally polarize one signal of the at least two polarization-matched signals relative to another signal of the at least two polarization-matched signals, wherein the at least two polarization-matched signals comprise different data streams with different content; and
   a signalling unit configured to signal measured data to another transceiver.

* * * * *